United States Patent [19]

Kleiber

[11] 4,277,141

[45] Jul. 7, 1981

[54] MULTIFACETED MIRROR AND ASSEMBLY FIXTURE AND METHOD OF MAKING SUCH MIRROR

[75] Inventor: Joseph P. Kleiber, Ontario, N.Y.

[73] Assignee: Tropel, Inc., Fairport, N.Y.

[21] Appl. No.: 117,046

[22] Filed: Jan. 31, 1980

Related U.S. Application Data

[63] Continuation-in-part of Ser. No. 24,656, Mar. 28, 1979, abandoned.

[51] Int. Cl.³ .......................... G02B 7/18; B29D 11/00
[52] U.S. Cl. .................................. 350/299; 350/320; 156/305; 156/285; 156/559; 264/1.1; 264/261; 264/511; 425/123; 425/110
[58] Field of Search .................. 350/299, 6.8, 6.7, 320, 350/292, 310, 303; 358/206; 156/305, 330, 285, 559; 264/261, 511; 425/123, 110; 248/467

[56] References Cited

U.S. PATENT DOCUMENTS

| 1,146,667 | 4/1963 | Rantsch | 350/299 |
|---|---|---|---|
| 1,662,554 | 3/1928 | Woeste | 350/299 |
| 1,912,731 | 6/1933 | Schroter | 264/261 |
| 2,163,537 | 6/1939 | Clothier et al. | 358/206 |
| 3,402,004 | 9/1968 | Warhol | 350/320 |
| 3,529,884 | 9/1970 | Ives et al. | 350/6.8 |

FOREIGN PATENT DOCUMENTS 503026  3/1939  United Kingdom ..................... 358/206

Primary Examiner—Jon W. Henry
Attorney, Agent, or Firm—Stonebraker, Shepard & Stephens

[57] ABSTRACT

A multifaceted mirror 10 is formed of individual plane mirrors 15 bonded to a support element or core 11 by a cement 14 in positions that are accurately located independently of the core. A base 30 has faces 31 accurately in the plane of the mirror faces, and locator blocks 40 having plane reference surfaces are secured to faces 31 to provide supports for accurately locating mirrors 15. The core 11 is placed inside a positioned array of mirrors 15, and the gaps between the mirrors and the core are filled with a cement such as epoxy. Trim strips 20 can be added to extend between and over the edges of the mirrors.

26 Claims, 11 Drawing Figures

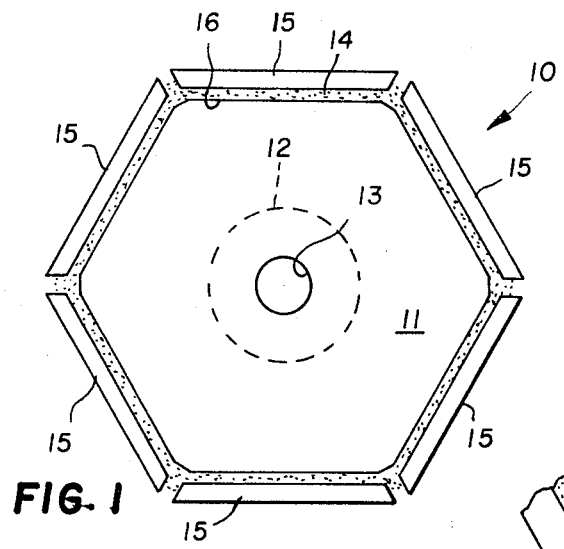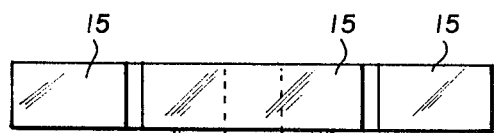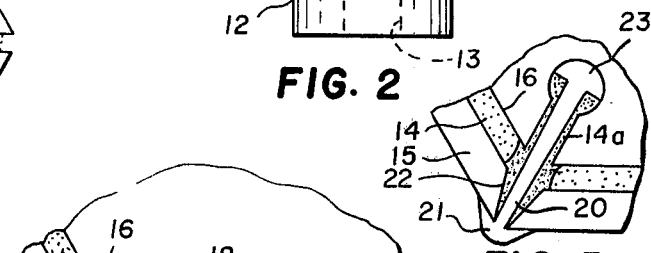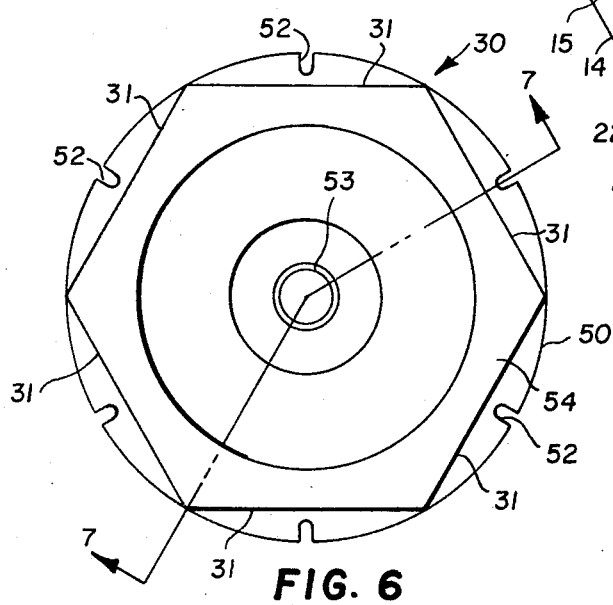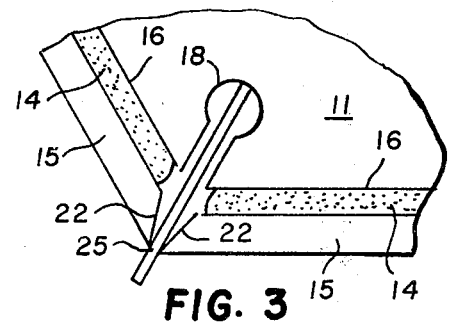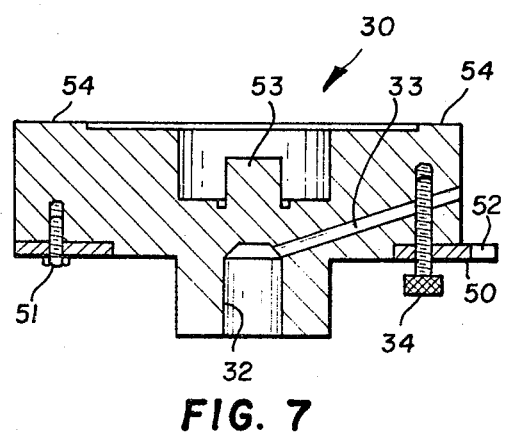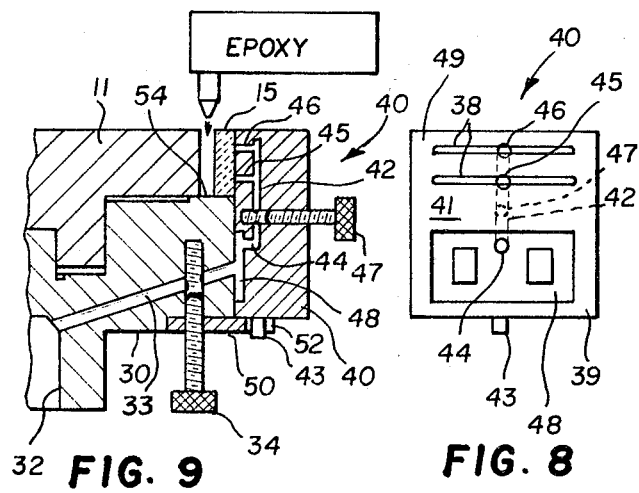

MULTIFACETED MIRROR AND ASSEMBLY FIXTURE AND METHOD OF MAKING SUCH MIRROR

RELATED APPLICATIONS

This application is a continuation-in-part of my parent application Ser. No. 024,656, filed Mar. 28, 1979, entitled MULTIFACETED MIRROR AND ASSEMBLY FIXTURE AND METHOD OF MAKING SUCH MIRROR, and abandoned upon the filing of this CIP application.

BACKGROUND OF THE INVENTION

Rotating multifaceted mirrors produce a high speed scanning beam of light that can be modulated for many purposes in laser printers and electro-optical scanning systems. Such spinning mirrors rotate at high speeds and require optical accuracy to within seconds of arc to produce high quality results. This makes them very expensive to fabricate.

The invention involves a new construction for a multifaceted mirror that is less costly to make without any sacrifice in accuracy and reliability. It includes a method of making multifaceted mirrors, a fixture for assemblying the mirrors, and the construction of the mirrors themselves.

SUMMARY OF THE INVENTION

A multifaceted mirror is made by cementing individual mirrors to a single-piece support element while the individual mirrors are held in accurate positions that are independent of the faces of the support. An assembly fixture has a base with faces that are accurately in the plane of the respective faces of the multifaceted mirror, and locator blocks with plane surfaces are attachable to each face of the base and provide mirror support surfaces extending beyond the base. The individual mirrors are secured to the mirror support surfaces of the locator blocks and held accurately in place while a support element is positioned adjacent the mirrors and the mirrors are cemented to the support element. A vacuum system is preferred for securing the locator blocks to the base and for securing the individual mirrors to the locator blocks, and valves can be used to control the vacuum as the fixture and mirror components are assembled.

DRAWINGS

FIG. 1 is a plan view of a preferred embodiment of a multifaceted mirror made according to the invention;

FIG. 2 is a side elevational view of the mirror of FIG. 1;

FIG. 3 is an enlarged fragmentary view of use of a spacer strip in making multifaceted mirrors according to the invention;

FIG. 4 is an enlarged fragmentary view of use of a trim strip in making multifaceted mirrors according to the invention;

FIG. 5 is an enlarged fragmentary view of a trim strip cemented in place;

FIG. 6 is a plan view of the base of an assembly fixture according to the invention;

FIG. 7 is a cross-sectional view of the fixture base of FIG. 6 taken along the line 7—7 thereof;

FIG. 8 is a front elevational view of a locator block for use with the fixture base of FIGS. 6 and 7;

FIG. 9 is a cross-sectional view of an assembled fixture holding individual mirrors and a support element for making a multifaceted mirror according to the invention;

DETAILED DESCRIPTION

Figure 10:
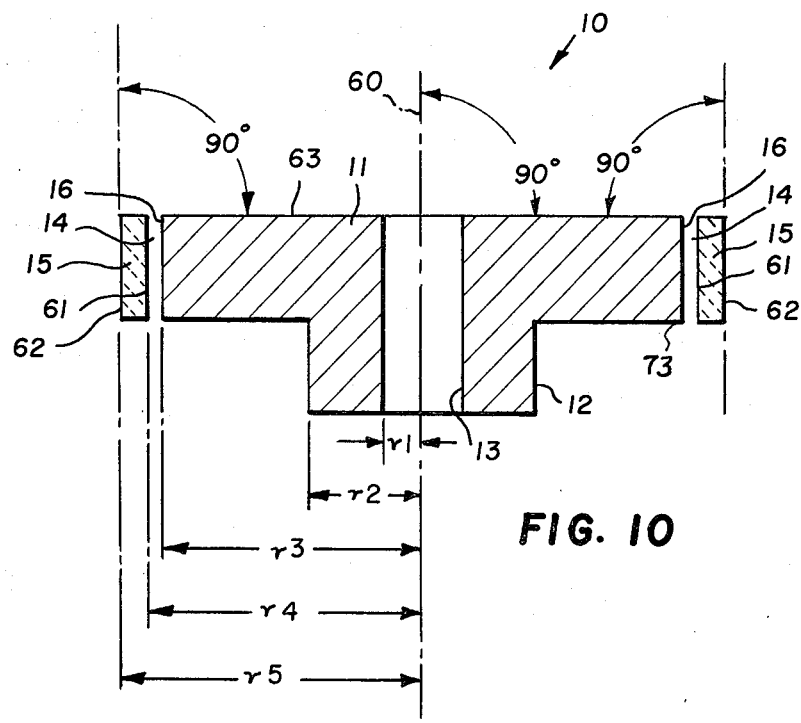
FIG. 10 is a cross-sectional view of an assembled mirror showing dimensions and angles held to high accuracies.

The invention applies wherever the faces of a multifaceted mirror require substantial accuracy. Most multifaceted mirrors rotate on an axis and have faces that are angled relative to each other and spaced around the rotational axis. They can have different numbers of faces at different angles and spacings relative to the rotational axis, and they can be used for many purposes. A typical use for such mirrors at present is in laser scanning devices where the mirrors rotate at high speed and have faces that ordinarily form a regular polygon in a plane perpendicular to the rotational axis.

Each reflective face of a polygonal mirror for laser scanning devices and other accurate optical uses must be optically flat, optically coated, and accurately located to within seconds of arc of a predetermined plane. Forming reflective surfaces by grinding, polishing, and coating facets of a single piece of glass presently makes the completed mirrors very expensive. Also, making such mirrors with individual metal faces that are independently adjustable has been attempted and is also expensive, troublesome, and inaccurate.

I fabricate and coat individual plane mirrors that are relatively inexpensive and then assemble these accurately to form a polygonal or multifaceted mirror, and I have found ways of doing this both accurately and economically to make better mirrors that cost less. By evaluating all the requirements carefully, I have been able to devise measures that insure accuracy of all relevant dimensions and balance of the rotational mass so that the mirror rotates smoothly at high speeds that can exceed 25,000 rpm.

Individual plane mirrors can be made accurately flat by standard methods that are inexpensive. Many individual mirrors can also be coated simultaneously and accurately with whatever optical coatings are required, to keep coating costs to a minimum. Accurate dimensioning of individual mirrors in both size and mass is also relatively inexpensive.

I use a very accurate assembly fixture that positions the individual mirrors precisely where desired and holds them accurately in place. The fixture itself is assembled of accurate components that hold the individual mirrors during fabrication and then disassemble to release the completed mirror. The entire fabrication can be accomplished on the fixture under clean conditions with a moderate level of skill and can achieve accuracies within a few seconds of arc.

A support element or core provides rotational or mounting support for the individual mirrors. The core is symmetrical and rotationally balanced and has an accurate rotational axis bore. It also has faces that lie parallel with and slightly spaced inward from the inner surfaces of the individual mirrors; and although the support element is mechanically accurate, its faces need not be optically accurate.

After positioning the individual mirrors in the assembled fixture, I place the support element radially inside the individual mirrors by fitting its axial bore over an axial locator pin on the fixture. This leaves small uniform gaps between the faces of the support element and the inner surfaces of the individual mirrors, and I inject epoxy or some other cement into these gaps to bond the individual mirrors securely to the support element. The optical accuracy of the positions of the outer faces of the individual mirrors is maintained by the assembly fixture and is independent of the faces of the support element. The cement filling the gaps is uniformly distributed around the optical axis to maintain rotational balance.

MIRROR

The resulting mirror 10 is shown in FIG. 1 as having six reflective faces; although 12 or more faces are common for polygonal mirrors, and any desired number of faces can be used. The faces of a multifaceted mirror made according to the invention need not form a polyhedron or a figure with a polygonal-shaped cross section, the mirror need not be rotatable, and the faces need not be in planes parallel to a rotational axis or any other line.

Epoxy 14 bonds individual mirrors 15 to support or core element 11 with sufficient adhesive strength to withstand the centrifugal force as mirror 10 rotates, and core element 11 provides a hub 12 and rotational support. Epoxy 14 is also preferred for bonding individual mirrors to a support element 11, even if high speed rotation is not required of the resulting multifaceted mirror 10.

Support 11 can be formed of cast metal, ceramic, or plastic and need not be highly accurate, because the reflecting faces of mirrors 15 are positioned independently of the corresponding faces 16 of support or core 11. Faces 16 of support 11 are spaced radially inward from mirrors 15 to leave parallel and uniform gaps between the inner surfaces of mirrors 15 and core faces 16 so that epoxy 14 can be injected between faces 16 and mirrors 15 to form a secure bond.

The radii and angles to be accurately maintained for mirror 10 are best shown in the cross-sectional view of FIG. 10. Bore 13 of support element 11 is accurately concentric with and aligned with rotational axis 60 and has a radius r1 as illustrated. The radius r2 of hub 12 is not a critical dimension, but the outer surface of hub 12 is also accurately concentric with axis 60 so that the hub provides a balanced rotational mass. Hub 12 can also be eliminated, and the disk-shaped body of support 11 can be fastened to a rotary element by screws parallel with the rotational axis.

The faces 16 of support element 11 are equally spaced from axis 60 by radii r3, which are accurate to precise mechanical tolerances. Faces 16 do not require optical polishing or exact optical location, however. Inner surfaces 61 of mirrors 15 are equally spaced from axis 60 by radii r4 that are larger than radii r3 so that cement 14 filling the gaps between support element 11 and mirrors 15 is uniformly distributed and rotationally balanced around axis 60. Outer surfaces 62 of mirrors 15 are positioned with high accuracy at radii r5 from axis 60 and held in place by the assembly fixture as explained below. Surfaces 62 are optically flat, uniformly coated, and positioned within a few seconds of arc to predetermined planes spaced around axis 60. Surfaces 62 are also accurately angled relative to each other.

As shown in FIG. 10, mirror surfaces 62 are parallel with rotational axis 60 and perpendicular to the plane 63 of the top surface of support element 11. Surfaces 62 can also be oblique to axis 60. Keeping surface 63 of support element 11 accurately perpendicular to axis 60 and bore 13 concentric with axis 60 insures that the mirror rotates without wobbling and provides an accurate linear scan path. In actual practice, the plane of surface 63 and the opposite surface 73 of support 11 is established only around the perimeter of support 11; and otherwise surfaces 63 and 73 are recessed slightly relative to their perimeters.

Balance of all the components of mirror 10 around the rotational axis 60 is important for smooth running at high speeds that can exceed 25,000 rpm and can cause vibration regardless of mounting arrangements. Accuracy in component dimensions and mass distribution insures a near perfect rotational balance, and final balancing is achieved by removing tiny amounts of material from hub 12. Mirrors lacking a hub 12 can be balanced via slightly oversized holes for screws extending parallel with the rotational axis.

As best shown in FIGS. 3–5, each corner of core 11 between each of the faces 16 of core 11 is preferably formed with a retainer slot 17 that includes a bore or enlargement 18. A trim strip 20 can then be inserted in retainer slot 17 and anchored in bore 18 to extend between and overlap the edges 22 of individual mirrors 15 as illustrated. The head 21 of retainer strip 20 preferably fits just over the edges 22 of mirrors 15 both for improved appearance and for security against any mirror 15 breaking loose and flying outward during rotation. Trim strip 20 is preferably an extrusion of metal or other high tensile strength material that is cut to length. It can have many different shapes for head 21 and anchorage end 23 fitting enlargement 18.

Retainer slot 17 can also be used to hold a spacer strip 25 as shown in FIG. 3 to insure proper spacing of individual mirrors 15 during assembly. Spacer strip 25 is preferably formed of a resinous material that does not bond to epoxy or whatever cement is used to bond mirrors 15 to core 11, and spacer strip 25 is removed after the cement 14 has set. The space left by strip 25 after its removal then leaves room for insertion of trim strip 20 as shown in FIG. 4. Another cement 14a is then used to fill spaces around trim strip 20 and bond trim strip 20 securely in place Cement 14a preferably has approximately the same density as cement 14 so that any irregularities in the proportions of the two cements does not upset rotational balance.

Figure 11:
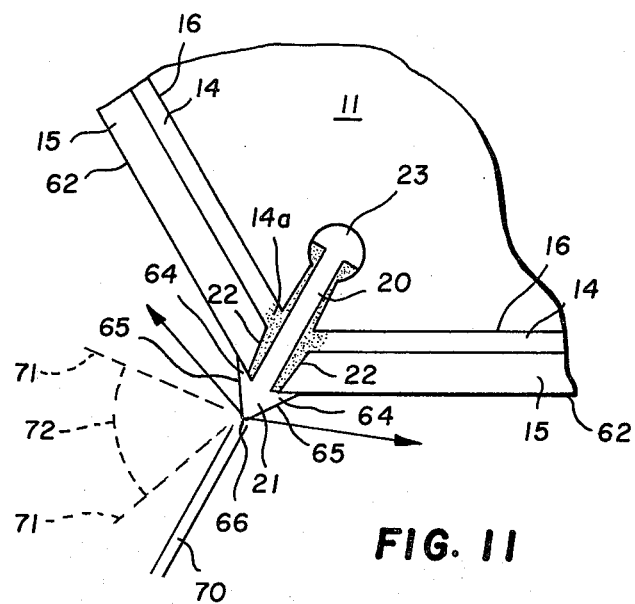
FIG. 11 is an enlarged plan view of a mirror fragment showing a preferred embodiment of a trim strip that diverts light from the mirror scanning path as the trim strip passes through a light beam.

A preferred shape for head 21 of trim strip 20 is best shown in FIG. 11. As a space or junction between mirror faces 62 rotates through a scanning beam 70, it can reflect light along a scan path 71 extending through an angle 72 to cause noise in the signal. When reflective surfaces are ground on a single glass element, a little rounding between them is unavoidable; and a brief light reflection from this causes a noise signal as scanning beam 70 passes from one face to the next. Head 21 of trim strip 20 can be shaped as shown in FIG. 11 to reduce this noise to a minimum.

This is accomplished by making head 21 nearly pointed with nearly flat sides 65 extending outward frm mirror surfaces 62 to converge along a line 66. This orients faces 65 to divert light from beam 70 outside the scanning path 71. Flat side faces 65 also accommodate hooks 64 that overlap the edges 22 of mirrors 15, both for appearance and mechanical security. Reducing noise as beam 70 passes from one surface 62 to the next cooperates with other features of my mirror to increase accuracy.

ASSEMBLY FIXTURE

A multifaceted base 30, such as shown in FIGS. 6 and 7, is the main element of an assembly fixture for making multifaceted mirrors according to my invention. Base 30 is preferably formed of hardened steel and has faces 31 that accurately conform to the planes of the faces 62 of mirror 10 to within seconds of arc. Base faces 31 then form reference surfaces for accurately positioning mirrors 15, and this is preferably done with vacuum.

A vacuum system connects to a socket 32 at the bottom of base 30, and vacuum passageways 33 lead from socket 32 to each face 31 of base 30. A screw 34 intersects each passageway 33 to form a manually operable valve for opening and closing each passageway 33. The pressure of the vacuum system is also preferably adjustable in a generally known way.

Locator blocks 40 as best shown in FIGS. 8 and 9 are formed to fit each face 31 of base 30 with a reference surface 41 that is accurately plane. The lower portion 39 of reference surface 41 provides a mounting surface engaging a face 31 of base 30, and an upper portion 49 of reference surface 41 provides a support surface for an individual mirror 15. Each block 40 has a vertical bore 42 plugged at the bottom by a pin 43, and holes 44-46 intersect bore 42 and open at the reference face of block 40. A screw 47 intersects bore 42 between holes 44 and 45 for manually controlling a vacuum as explained more fully below.

An abutment plate 50 secured to the underside of base 30 by screws 51 provides a reference surface perpendicular to face surfaces 31 for locating blocks 40. Notches 52 in abutment plate 50 are centered under each face 31 of base 30. One of the locator blocks 40 is positioned against each face 31 of base 30 to rest on abutment plate 50 with pin 43 extending into notch 52 and plane reference surface 41 conforming securely and accurately to the plane of surface 31.

A shallow recess 48 in reference surface 41 of blocks 40 communicates with hole 44 so that vacuum applied at surface 31 via passage 33 and screw valve 34 in base 30 evacuates recess 48 and holes locator block 40 accurately against face 31. A vacuum system for holding locator blocks 40 on base 30 has the advantages of easy assembly and disassembly and also makes presence of any dirt or inaccuracies in assembly more readily detectable.

After mounting surfaces 39 of locator blocks 40 are positioned accurately in contact with faces 31 of base 30 and held in place by respective vacuums, individual mirrors 15 are secured to the support surfaces 49 of locator blocks 40. This is done by placing each individual mirror 15 accurately against a support surface 49 and opening screw valve 47 to bring the vacuum applied to mounting surface 39 into communication with support surface 49 via passageway 42 and holes 45 and 46 that open into shallowly recessed slots 38. This evacuates slots 38 and applies a vacuum to mirror 15 for holding the mirror securely in place and also indicating its accurate engagement with support surface 49.

Then core 11 is inserted into the assembly of locator blocks and mirrors to be positioned radially inside mirrors 15 and accurately centered by bore 13 in hub 12 being fitted over a locator pin 53 accurately centered in base 30. Core 11 and mirrors 15 are supported in the axial direction by an accurate reference surface 54 formed around the upper perimeter of base 30. If core 11 has retainer slots 17 and if spacer strips 25 are desired, they are inserted between mirrors 15 to extend outward between locator blocks 40.

When everything is accurately assembled and securely held in place, epoxy or other suitable cement is injected into the open gaps between core 11 and mirrors 15 as schematically shown in FIG. 9 for cementing the mirrors to the core. After the cement has set, spacer strips 25 are removed; and trim strips 20 are inserted in retainer slots 17 to protect the edges of mirrors 15 and present a clean and neat outward appearance. The vacuum is shut off and locator blocks 40 are removed to release the assembled mirror from the fixture. The assembled mirror is then balanced and tested and is ready for use.

Many variations in the illustrated details are possible. A vacuum system and valving can be arranged in other ways, and locator blocks 40 can have many different configurations. The optimum arrangement preserves the high accuracy available with minimal expense in machining and shaping base 30 and locator blocks 40. Making the individual mirrors 15 is well understood and relatively inexpensive; and core 11 can be a simple casting, since its accuracy is not critically involved in the result. By keeping the assembly highly clean and holding all the components to high accuracies, end results within a few seconds of arc can be obtained without prohibitive expense.

Multifaceted mirrors having shapes other than a regular polygon as illustrated can also be made according to the invention by using different shaped bases and locator blocks of an assembly fixture and different shaped support elements so that each individual mirror is held accurately in a predetermined plane and bonded securely to an adjacent support. Workers skilled in the art of optical assemblies will understand the available alternatives and their relative merits once the basic concepts are understood.

I claim:
1. A method of making a multifaceted mirror having a plurality of faces disposed in respective planes that are angled relative to each other, said method comprising:
   a. making a plurality of individual mirrors sized to form the faces of said multifaceted mirror;
   b. positioning each of said individual mirrors accurately in the planes of the respective faces of said multifaceted mirror and holding said individual mirrors securely in position;
   c. locating a support element adjacent said positions of said individual mirrors;
   d. filling gaps between said support element and said individual mirrors with a cement that bonds said individual mirrors securely to said support element while said individual mirrors are held in said positions, said individual mirrors bonded to said support element forming said multifaceted mirror; and
   e. placing trim strips between each of said individual mirrors after said individual mirrors are bonded to said support element.

2. The method of claim 1 including using an assembly fixture with surfaces that establish said planes of said individual mirror positions, and positioning said individual mirrors against said fixture surfaces.

3. The method of claim 2 including using vacuum to hold said individual mirrors against said fixture surfaces.

4. The method of claim 2 including using vacuum to hold movable locator blocks on said assembly fixture in said individual mirror positions.

5. The method of claim 4 including removing said locator blocks to release said mirror from said assembly fixture.

6. The method of claim 1 including placing spacer strips between each of said individual mirrors before filling said gaps.

7. The method of claim 6 including removing said spacer strips after said bonding, and placing said trim strips in spaces left by said spacer strips.

8. A method of making a multifaceted scanning mirror rotatable on an axis to direct light along a scanning path, said mirror being formed of a plurality of individual mirrors secured to a single piece support element to form a plurality of faces, and said method comprising:
   a. making said plurality of individual mirrors the same size and mass with plane outer surfaces to form said mirror faces;
   b. coating said outer faces of said individual mirrors uniformly and simultaneously with an optical coating;
   c. by using an assembly fixture with surfaces that establish positions for said outer faces of said individual mirrors and by placing said individual mirrors against said fixture surfaces, positioning each outer face of each of said individual mirrors accurately at predetermined angles to each other, at the same predetermined angle to said mirror axis, and at equal radii from said axis;
   d. using vacuum to hold said individual mirrors against said fixture surfaces in said accurate positions;
   e. fitting an axial hole on a centering pin of said fixture to locate a support element within said positioned individual mirrors so that faces of said support element are spaced uniformly from inner faces of said individual mirrors, and said support element is symmetrical and balanced for high speed rotation on said mirror axis; and
   f. filling gaps between said support element faces and said inner faces of said individual mirrors with a cement that bonds said individual mirrors securely to said support element faces while said individual mirrors are held accurately in said positions, said cement being uniformly distributed and balanced for high speed rotation on said mirror axis.

9. The method of claim 8 including using vacuum to hold movable locator blocks on assembly fixture in said individual mirror positions.

10. The method of claim 9 including removing said locator blocks to release said mirror from said assembly fixture.

11. The method of claim 8 including positioning trim strips to extend between said individual mirrors and over edges of said individual mirrors, and securing said trim strips in place relative to said support element.

12. The method of claim 11 including shaping portions of said trim strips extending beyond said outer faces of said individual mirrors to divert light from said scanning path of said mirror.

13. A fixture for assembling multifaceted mirrors having a plurality of faces disposed in respective planes that are angled relative to each other, said fixture comprising:
   a. a base having a plurality of faces corresponding with the faces of said multifaceted mirror, each face of said base being accurately in the plane of a respective face of said multifaceted mirror;
   b. a plurality of locator blocks corresponding to said faces of said base and said multifaceted mirror, each of said locator blocks having a mounting surface for removably engaging one of said faces of said base and a mirror support surface in the plane of said mounting surface and extending beyond said base;
   c. means for removably securing said locator blocks to respective faces of said base;
   d. means for removably securing a plurality of individual mirrors respectively to said support surfaces of said locator blocks to position said individual mirrors at the faces of said multifaceted mirror; and
   e. means on said base for receiving and holding a support element positioned adjacent said individual mirrors so said individual mirrors can be cemented to said support element while secured to said locator blocks to form said multifaceted mirror.

14. The fixture of claim 13 wherein said means for securing said locator blocks to said base includes a vacuum system with vacuum passageways opening at each of said faces of said base.

15. The fixture of claim 14 including valves in said base for opening and closing each of said vacuum passageways.

16. The fixture of claim 14 wherein said means for securing said individual mirrors to said locator blocks include vacuum passageways in said locator blocks communicating with said vacuum passageways in said base and opening at said mirror support surfaces.

17. The fixture of claim 16 including valves in said locator blocks for opening and closing said vacuum passageways to said mirror support surfaces.

18. The fixture of claim 13 including an abutment plate secured to said base to position said locator blocks in a direction perpendicular to the planes of said faces of said base.

19. The fixture of claim 13 including a centering pin accurately located on the axis of said mirror for receiving and holding a central axial hole of said support element.

20. A multifaceted mirror having a plurality of faces disposed in respective planes that are angled relative to each other, said mirror comprising:
   a. a single-piece support element having faces corresponding to the faces of said multifaceted mirror;
   b. a plurality of individual mirrors, each individual mirror being spaced from a respective face of said support element;
   c. cement securing each of said individual mirrors to said respective face of said support element in an accurate position that is independent of said face of said support element;
   d. said individual mirrors being arranged with clearance space between each of said individual mirrors;
   e. said support element having retainer slots between each face of said support element; and
   f. trim strips secured in each of said retainer slots to extend between each of said individual mirrors.

21. The mirror of claim 20 wherein said trim strips are shaped to extend over edges of said individual mirrors.

22. The mirror of claim 21 wherein portions of said trim strips extending beyond outer faces of said individual mirrors are shaped to divert light from a scan path of said mirror.

23. A multifaceted scanning mirror rotatable on an axis to direct light along a scanning path, said mirror being formed of a plurality of individual mirrors secured to a single piece support element to form a plurality of faces, and said mirror comprising:
   a. said support element having a shaft-receiving central opening accurately concentric with and aligned with said axis;
   b. said support element being generally symmetrical and balanced for high speed rotation on said axis;
   c. said support element having faces corresponding to and generally parallel with said mirror faces and disposed radially toward said axis from said mirror faces;
   d. said individual mirrors having uniform optical coatings and having the same size and mass;
   e. each of said individual mirrors having plane inner surfaces equally spaced from and generally parallel with a respective face of said support element;
   f. each of said individual mirrors having plane outer surfaces forming said mirror faces and accurately disposed at predetermined angles to each other, at the same predetermined angle to said axis, and at equal radii from said axis in positions that are independent of said faces of said support element;
   g. cement securing said inner faces of said individual mirrors to respective faces of said support element; and
   h. said cement uniformly filling the spaces between said inner faces of said individual mirrors and said faces of said support element and being balanced for said high speed rotation on said axis.

24. The mirror of claim 23 wherein said individual mirrors are spaced apart, and trim strips extend between said individual mirrors and over edges of said individual mirrors and are secured in place relative to said support element.

25. The mirror of claim 24 whrein portions of said trim strips extending beyond said outer faces of said individual mirrors are shaped to divert light from said scanning path of said mirror.

26. The mirror of claim 25 wherein said support element has retainer slots between each of said faces, and said trim strips are secured in said retainer slots.

* * * * *